United States Patent [19]

Udelle et al.

[11] Patent Number: 5,785,005
[45] Date of Patent: Jul. 28, 1998

[54] ANIMAL ATTRACTING TOY DEVICE

[76] Inventors: Steven D. Udelle; Laura L. Udelle, both of 13 Seasons Dr., Punta Gorda, Fla. 33983-5432

[21] Appl. No.: 859,117

[22] Filed: May 20, 1997

Related U.S. Application Data

[63] Continuation-in-part of Ser. No. 618,899, Mar. 20, 1996, Pat. No. 5,673,651, which is a continuation-in-part of Ser. No. 475,936, Jun. 7, 1995, Pat. No. 5,517,948.

[51] Int. Cl.$^6$ ................................................ A01K 29/00
[52] U.S. Cl. ........................ 119/706; 119/707; 446/168
[58] Field of Search ........................... 119/702, 706, 119/707, 711; 446/131, 136, 168, 170; 473/571; D30/160

[56] References Cited

U.S. PATENT DOCUMENTS

| | | | |
|---|---|---|---|
| 254,768 | 3/1882 | Haynes | D30/160 |
| D. 335,553 | 5/1993 | Conner | D30/160 |
| 1,789,333 | 1/1931 | Da Costa | 119/707 |
| 2,086,631 | 7/1937 | Munro | 119/711 |
| 4,722,299 | 2/1988 | Mohr | 119/707 |
| 4,737,134 | 4/1988 | Rumsey | 473/571 |
| 5,009,193 | 4/1991 | Gordon | 119/707 |
| 5,269,261 | 12/1993 | Mc Cance | 119/707 |
| 5,575,240 | 11/1996 | Udelle et al. | 119/707 |

*Primary Examiner*—Todd E. Manahan

[57] ABSTRACT

An annular ball track is provided with a flat top surface having a material affixed thereon for the purpose of claw scratching. A hollow ball containing an electronic sound synthesizer within is disposed inside the annular track and visible around the periphery of the track. A switch operates the electronic sound synthesizer within the ball and broadcasts mouse related scratching sounds and/or squeaks, thereby serving as an irresistible attractant to an animal for promoting more frequent exercise by swatting and chasing the ball, and to encourage the claw scratching needs inherent to animals, thereby saving articles of furniture from claw damage.

11 Claims, 3 Drawing Sheets

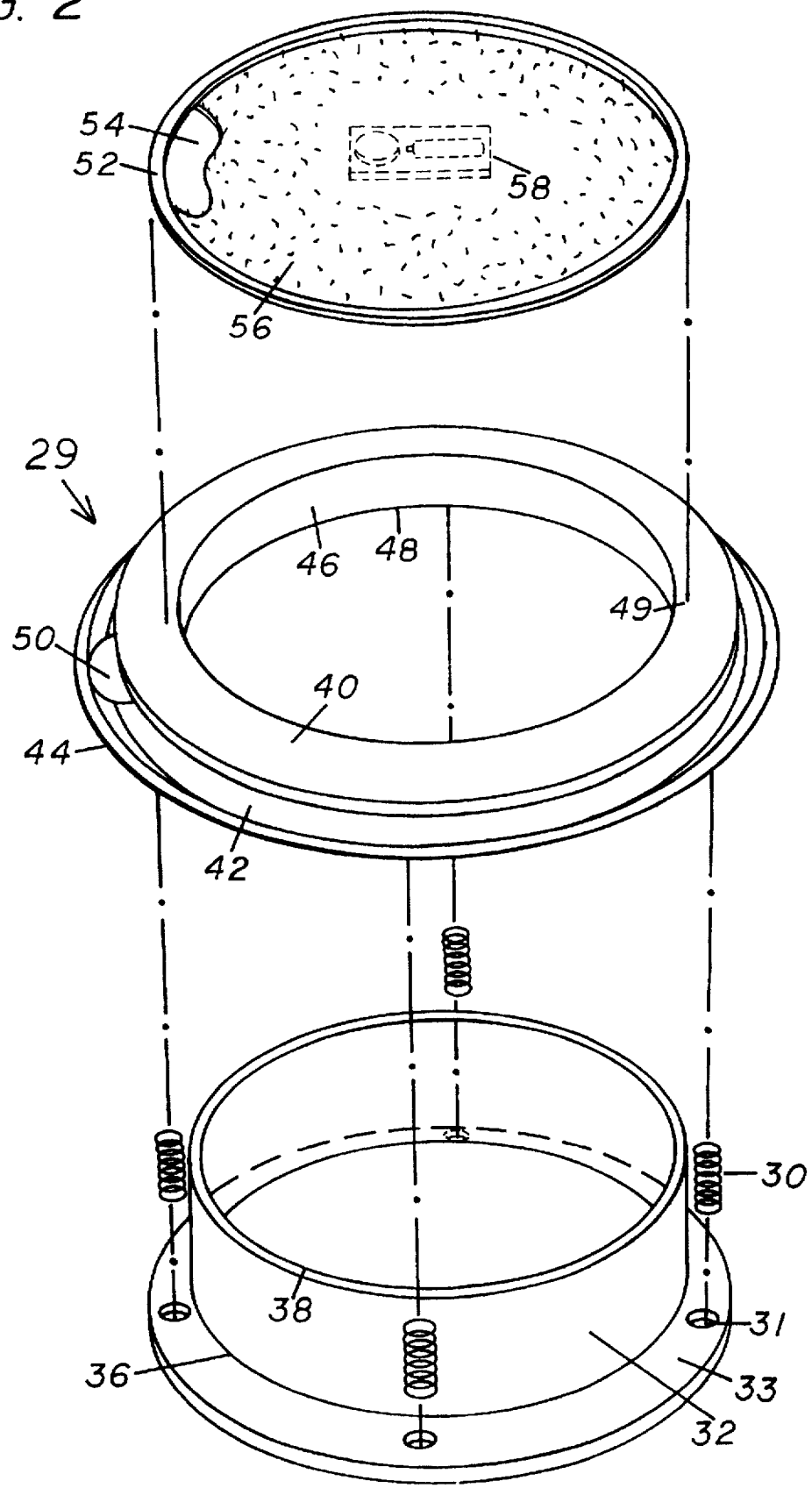

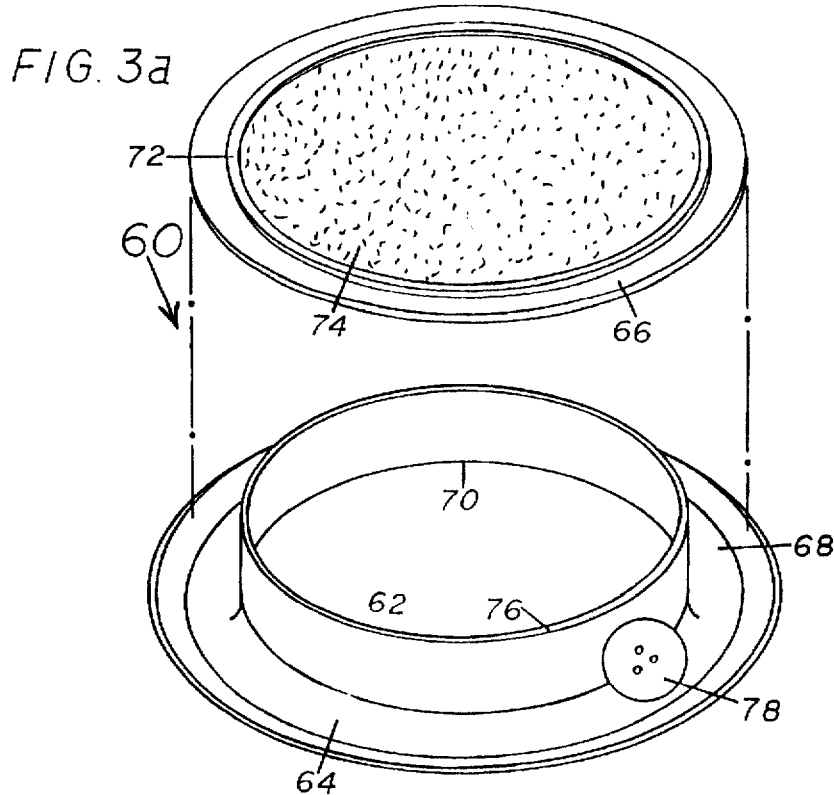
FIG. 3a
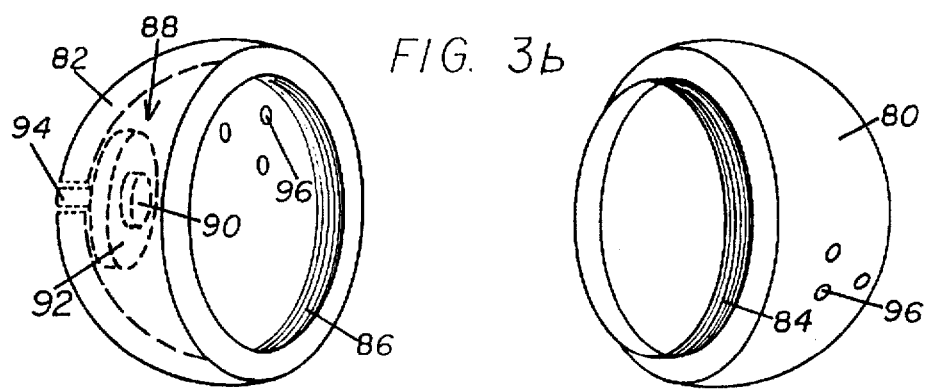
FIG. 3b
FIG. 3c
FIG. 3d

5,785,005

ANIMAL ATTRACTING TOY DEVICE

This application is a continuation-in-part of application Ser. No. 08/618,899, filed Mar. 20, 1996, titled "Animal Toy Having Pivotally Mounted Annular Ball Confining Track," now U.S. Pat. No. 5,673,651, which was a continuation-in-part of application Ser. No. 08/475,936, filed Jun. 7, 1995, now U.S. Pat. No. 5,517,948.

FIELD OF THE INVENTION

The present invention deals with animal toy and claw scratching devices, but more particularly to an improved combined animal device that provides claw scratching and indirect motion of an object within the device as a compelling attraction to an animal, whereby an animal will frequent the device on its own initiative more often, thereby improving its physical condition, health, and mental alertness through its own efforts.

BACKGROUND-DISCUSSION OF THE PRIOR ART

U.S. Pat. No. 5,269,261 by McCance, Dec. 14, 1993 shows a track and ball with a corrugated cardboard claw scratching means. Applicants have purchased this device and other ball track devices. The pet owner has to participate in moving the ball before a cat will join in. When the cat is claw scratching, the ball remains motionless and therefore does not present the incentive of motion. These purchased devices are seldom used, unless a human forces the ball into play. The prior art does not teach on the use of a motivational means that would exhibit an irresistible incentive or attraction to an animal, whereby the animal would benefit from increased use of the device.

SUMMARY OF THE INVENTION

The present invention takes advantage of the inherent instincts of an animal's response to a moving object, when the original movement of the object is not directly initiated by the animal or human hand, but by the device. Generally, the present invention comprises a circular housing forming a base, with an annular ring forming a track loosely encircling the housing, and supported level by a plurality of springs affixed to the lower edge of the housing. A freely movable object, such as a ball is confined within the track and viewable from a continuous opening in the side of the track. An upper surface is affixed to the upper edge of the housing and limits the vertical rise of the track. The upper surface contains a claw scratching material. Any slight downward pressure on the upper track ring assembly will cause the track ring to move or tip downwards opposing the springs, as an animal mounts the carpeted platform, thereby causing a ball within the track to move. Whenever an animal mounts the device for claw scratching, the lure or ball will move due to the slight tipping of the track upon contact. The movement of the ball will always produce a reaction from the animal, whereby chasing or swatting the ball is imminent.

It is therefore an object of the present invention to provide an animal toy and claw scratching device that does not require any direct contact with a lure ball by an animal or human hand to initiate a provocative movement of the lure ball.

It is an object of the present invention to have an animal expend its surplus energy, thereby developing improved muscle tone, alertness, coordination, and better sleeping habits.

It is an object of the invention that upon mounting the device, a cat will always respond to the moving lure.

It is another object that the animal toy and claw scratching device would relieve the animal from boredom by providing more frequenting, thereby saving areas of household furniture from damage.

It is yet another object of the invention that the employment of an electronic sound synthesizer in the device serves as an attractant to a cat.

Other objects and advantages may be readily determined by the following descriptions.

BRIEF DESCRIPTION OF THE DRAWINGS

FIG. 2 is an exploded perspective view of an alternate embodiment of FIG. 1.

FIG. 3a is an exploded view in perspective of a third alternate embodiment of FIG. 1 showing a stationary circular track ring, carpeted top surface, and a freely movable ball.

FIG. 3b is an exploded view in perspective of two ball halves that house an electronic sound synthesizer assembly employed in the circular track ring of FIG. 3a.

FIG. 3c is a cross sectional side plan view showing a portion of the circular track ring cavity housing a ball.

FIG. 3d is a top plan view of the circular track ring with the carpeted top surface.

COMPLETE DESCRIPTION OF THE INVENTION

Figure 1:
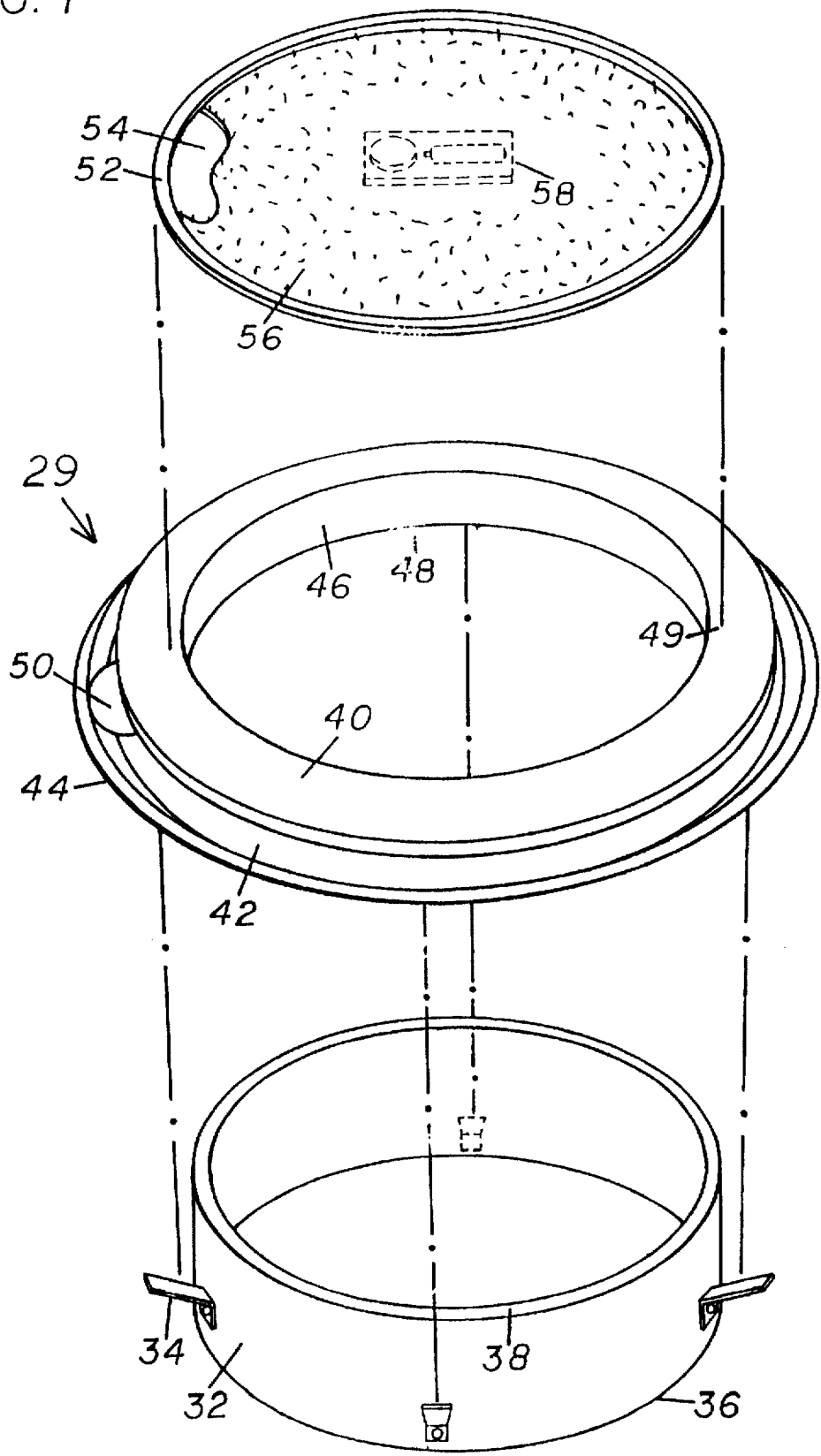
FIG. 1 is an assembly shown in an exploded perspective view of a freely movable circular track ring, and a carpeted housing.

FIG. 1 is an exploded perspective view of a preferred embodiment of the present invention showing a circular housing 32 forming a base having a lower edge 36 and an upper edge 38. A plurality of yielding spring blades 34 are affixed near the lower edge 36 of housing 32. An annular ring assembly forming a continuous track 29 encircles the peripheral sidewall of housing 32 and freely rests with a level attitude on spring blades 34. The continuous track assembly 29 is comprised of an inner wall 46, a bottom 48, a top 40, and an open side 42. The bottom 48 of the track angles outwards 44, thereby confining a ball 50 disposed therein and freely movable. The track assembly 29 inner wall 46 is provided with sufficient spacing around the peripheral housing 32 wall surface, to permit the track assembly 29 to be freely pivotal angularly, and laterally around housing 32 surface as its bottom 48 rests on the yielding spring blades 34. The underside of upper planar surface 54 is heat sealed to upper edge 38 of housing 32, thereby limiting the vertical rise of track assembly 29 around housing 32. Upper surface 54 is slightly larger in diameter than the housing 32 diameter, thereby overlapping onto the top 40 of track assembly 29 at top portion 49. The spring blades 34 have sufficient tension to hold track assembly 29 top surface 40 flush against the overhanging underside of upper surface 54. The upper surface 54 employs a raised ridge 52 around its edge to serve as a finishing means for claw scratching material 56. A miniature sound synthesizer 58 is affixed to the underside of upper surface 54.

FIG. 2 is an exploded perspective view of an alternate embodiment of FIG. 1. The addition of flange 33 affixed to the lower edge 36 of housing 32 provides a means for substituting the spring blades 34 as shown in FIG. 1 for a plurality of helical springs 30. The lower portion of helical springs 30 are permanently affixed to their respective openings 31. The track ring assembly 29 is held level by the springs and is freely pivotal angularly and laterally around housing 32 outside wall surface. The rest of FIG. 2 is identical to FIG. 1. Unlike applicants' earlier device, the track ring assembly 29 of FIGS. 1 and 2 can be deflected downwards at any point of its 360 degree circumference, thereby always initiating a positive ball movement from any point of contact with the track top 40 and angled bottom 44. The improved present invention produced new and unexpected results in the performance of an animal's playing techniques and exercise. The improved sensitivity of the pivotal track initiates better ball response. The animal will chase the orbiting ball around the outside perimeter of the device promoting better exercise. The ball is only visible to an animal in a portion of the track, thereby requiring the animal to use its thought processes in finding the ball for further play. The animal will also lay in a fixed position by the track side opening and repeatedly propel the ball with one paw as the ball orbits the track for extended periods of time. Tracks that have a ball viewable from a top opening limit the technique of play and exercise of an animal, as one or more of their paws stand inside the track opening and block the ball from orbiting. Applicants have rarely seen an animal chase an orbiting ball around the outside perimeter of an open top track, as the ball is always visible to pounce upon instead. A miniature electronic sound synthesizer 58 is affixed to the underside of upper surface 54. The electronic sound synthesizer may be of the greeting card type or children's toy synthesizer that is programmed to broadcast intermittant mouse related scratching sounds and/or squeaks to attract the animal to the device. The synthesizer may also employ an on-off switch. A sound such as a mouse scratching would promote more frequent claw scratching inherent in cats on the device, thereby preventing household furniture from being damaged.

FIG. 3a is an exploded perspective view of a third alternate embodiment of FIG. 1, showing the circular track ring or annular track assembly 60 having an inner wall 62, a bottom 64, a top surface 66, an open side 68, and a base 70. The top surface 66 is provided with a brief ridge 72 for framing claw scratching material 74. When top surface 66 is affixed to the top edge 76 of annular track assembly 60, the hollow, freely movable object or ball 78 will be confined within the track and is viewable through open side 68.

FIG. 3b is an exploded view in perspective of both halves or portions of hollow ball 78 of FIG. 3a, and electronic sound synthesizer assembly 88 shown in hidden lines. The first hollow ball portion 80 is provided with a male threadable end 84 and the second hollow ball portion 82 is provided with a female threadable end 86. Miniature sound synthesizer assembly 88 is comprised of the battery 90, synthesizer body 92, and push-on, push-off function switch extension 94 as an integral assembly. The sound synthesizer assembly 88 is affixed to the interior wall of hollow ball portion 82 by a double-sided adhesive pad, not shown, or by any other suitable fastening method. Push-on, push-off function switch extension 94 projects through a hole 95 provided to the outside surface of hollow ball portion 82. The function switch extension 94 can be actuated at the ball's surface without removing the ball from the track or disassembling the ball. The only time the ball portions require separating is to replace a watch type battery 90 every two or three years. The miniature sound synthesizer assembly can be compared as being slightly larger than a greeting card synthesizer. The wall thickness of the ball is of sufficient mass or weight for the ball to orbit the track many times when swatted by an animal's paw. The sound synthesizer assembly is completely confined within the hollow ball when ball portions 80 and 82 are threadably mated. The ball 78 is wedged through the flexible or yielding side opening 68 of track assembly 60, more clearly shown in FIG. 3c. When push-on, push-off function switch 94 is closed, it activates miniature electronic sound synthesizer assembly 88, whereby it will broadcast sounds, such as typical scratching or squeaking sounds associated with a mouse. Ball portions 80 and 82 are provided with small holes 96 for sound escape.

FIG. 3c is a partial plan side view in cross-section showing side opening 68 of track assembly 60 and hollow ball 78.

FIG. 3d is a top plan view of annular track assembly 60 with the claw scratching surface 74.

The broadcasted luring sounds of the synthesizer work best when they are intermittent. For example, a broadcast of a mouse related scratching sound within the ball for 15 seconds followed by 15 or 30 seconds of silence broken by an occasional mouse-related squeak. This intermittant sequence is continuously repeated when the synthesizer switch is in the on position. Since animals are equipped with a keen sense of hearing, the sounds emanating from the ball do not have to be heard by the human ear to be effective. The extensive battery life provides a good measure of economy for the consumers' extremely useful purchase. The ball portions may be joined together by other methods, such as twist-lock, snap on connections, or the like. It is well-known that passive animal toys do not lure or initiate frequent play by an animal that really satisfies the consumer's investment. The present invention overcomes this deficiency by providing a broadcasted or luring incentive for an animal's inherent stalking and curiosity instincts.

CONCLUSION

Thus, it has been shown that the action of the present invention solves the shortcomings of passive devices, past and present, thereby satisfying the consumers investment with a realistic and more frequently used product. The present invention may be added to induce more frequent use of other passive animal devices by luring sounds, such as various shaped claw scratching devices, amusement toys, etc. While the above descriptions contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:
1. An animal attracting toy device comprising:
   a) a track forming a base, said track having an inner wall, a bottom, a partially open top, and a partially open side;
   b) an upper surface affixed to said partially open top of said track; and
   c) an object confined within said track, said object consisting essentially of a housing, a synthesizer disposed within said housing, a power source, and a manually operated on-off switch for conserving said power source connecting the power source to the synthesizer.
2. The toy device of claim 1, wherein said track is annular.
3. The toy device of claim 1, wherein said housing is substantially a sphere.
4. The toy device of claim 3, wherein said sphere is hollow.
5. The toy device of claim 4, wherein said sphere is comprised of at least two portions which are releasably connected.

6. The toy device of claim 1, wherein a portion of said object is removable to permit access to said synthesizer.

7. The toy device of claim 1, wherein said on-off switch extends through an opening in said object to an exterior surface of said object.

8. The toy device of claim 1, wherein said synthesizer produces mouse related scratching sounds.

9. The toy device of claim 1, wherein said synthesizer produces mouse related squeaks.

10. The toy device of claim 1, wherein said upper surface affixed to said track includes means for an animal to scrape and stretch its claws thereon.

11. The toy device of claim 10, wherein said means for an animal to scrape and stretch its claws comprises a piece of material suitable for clawing affixed to said upper surface.

* * * * *